(12) United States Patent
Valenti (10) Patent No.: US 8,044,748 B2
(45) Date of Patent: Oct. 25, 2011

(54) HYBRID COUPLER AND UHF TELEVISION CHANNEL MIXER COMPRISING SUCH A HYBRID COUPLER

(75) Inventor: Daniele Valenti, Morbegno (IT)

(73) Assignee: Com-Tech S.R.L., Morbegno (IT)

( * ) Notice: Subject to any disclaimer, the term of this patent is extended or adjusted under 35 U.S.C. 154(b) by 699 days.

(21) Appl. No.: 11/662,524

(22) PCT Filed: Sep. 10, 2004

(86) PCT No.: PCT/IT2004/000488
§ 371 (c)(1),
(2), (4) Date: Sep. 25, 2008

(87) PCT Pub. No.: WO2006/027806
PCT Pub. Date: Mar. 16, 2006

(65) Prior Publication Data
US 2009/0033802 A1 Feb. 5, 2009

(51) Int. Cl.
*H01P 5/18* (2006.01)
*H01P 5/12* (2006.01)

(52) U.S. Cl. .................................. 333/116; 333/109

(58) Field of Classification Search .................. 333/109, 333/110, 111, 112, 115, 116
See application file for complete search history.

(56) References Cited

U.S. PATENT DOCUMENTS

| | | | | |
|---|---|---|---|---|
| 3,617,952 | A * | 11/1971 | Beech | 333/116 |
| 5,499,001 | A * | 3/1996 | Degun et al. | 333/115 |
| 5,774,193 | A | 6/1998 | Vaughan et al. | |
| 7,429,903 | B2 * | 9/2008 | Antkowiak | 333/115 |

FOREIGN PATENT DOCUMENTS

| | | |
|---|---|---|
| GB | 1 519 254 A | 7/1978 |
| GB | 1519254 A * | 7/1978 |

OTHER PUBLICATIONS

Chang, Tien-Yu et al. "Coplanar-Waveguide Tandem Couplers with Backside Conductor", *IEEE Microwave and Wireless Components Letters*, vol. 13, No. 6, Jun. 2003, pp. 214-216.

Lange, J. "Interdigitated stripline quadrature hybrid", *IEEE Transactions on Microwave Theory and Techniques*, Dec. 1969, pp. 1150-1151.

Tresselt, C.P. "The Design and Construction of Broadband, High-Directivity, 90-Degree Couplers Using Nonuniform Line Techniques", *IEE Transactions on Microwave Theory and Techniques*, vol. MTT-14, No. 12, Dec. 1966, pp. 647-656.

Search Report issued by European Patent Office on Oct. 10, 2008 for corresponding European application 04787587.7.

* cited by examiner

*Primary Examiner* — Dean Takaoka
(74) *Attorney, Agent, or Firm* — Frommer Lawrence & Haug LLP; Ronald R Santucci (57) ABSTRACT

A hybrid coupler for UHF-band television transmission has a box containing two lines, each of which is insulated from the box and from the other line, is connected to the other line in a "tandem" configuration, and has a first, a second, and a third portion separate from one another and connected respectively to the third, second, and first portion of the other line to define a first, a second, and a third coupling section to achieve a constant connection over the whole UHF band.

22 Claims, 7 Drawing Sheets

HYBRID COUPLER AND UHF TELEVISION CHANNEL MIXER COMPRISING SUCH A HYBRID COUPLER

This application is a 371 of PCT/IT2004/000488 filed on Sep. 10, 2004, published on Mar. 16, 2006 under publication number WO 2006/027806 A1.

TECHNICAL FIELD

The present invention relates to a hybrid coupler for UHF-band television transmission.

BACKGROUND ART

An important application of hybrid couplers is the production of directional filters by means of a balanced structure comprising two band-pass filters and two hybrid couplers, and which, commonly known as a double-bridge channel mixer, provides for combining a number of frequencies at the same output.

Currently used UHF-band hybrid couplers comprise quarter-wave coupled lines, and have a band unbalance of about 0.5 dB, which has no particular effect, except noticeably impairing matching of the wide-band transition port of the directional filter. Currently used quarter-wave hybrid couplers, in fact, provide for a maximum theoretical match of 25 dB return loss at the wide-band port. This is decidedly poor when cascade-connection of a number of systems is required, and accumulated reflection inevitably produces unacceptable matching values.

The current trend is to solve the problem by means of complex adjustments and compensating devices, in an attempt to improve matching of only required frequencies.

In any case, the problem involves specific, normally painstaking, adjustments, limits the maximum number of channels that can be combined, and does not permit versatile use of the directional filters, i.e. cascade connection of independent modules. These drawbacks are further compounded in the case of the latest digital television transmission systems (DVB-T and ATSC) which frequently involve inserting a new frequency on an existing radiating system, and, simultaneously, strict transmission filtration (Ref. ETSI EN 300 744 V1.4.1).

DISCLOSURE OF INVENTION

It is an object of the present invention to provide a hybrid coupler designed to eliminate the aforementioned drawbacks.

According to the present invention, there is provided a hybrid coupler as claimed in claim 1.

The hybrid coupler described herein solves these problems by means of a multisection structure and tandem arrangement, which provide for moderate couplings which translate physically into large insulation distances and improved high-power resistance.

The present invention also relates to a television channel mixer.

According to the present invention, there is provided a television channel mixer as claimed in claim 21.

BRIEF DESCRIPTION OF THE DRAWINGS

A preferred, non-limiting embodiment of the present invention will be described by way of example with reference to the accompanying drawings, in which.

BEST MODE FOR CARRYING OUT THE INVENTION

Figure 1:
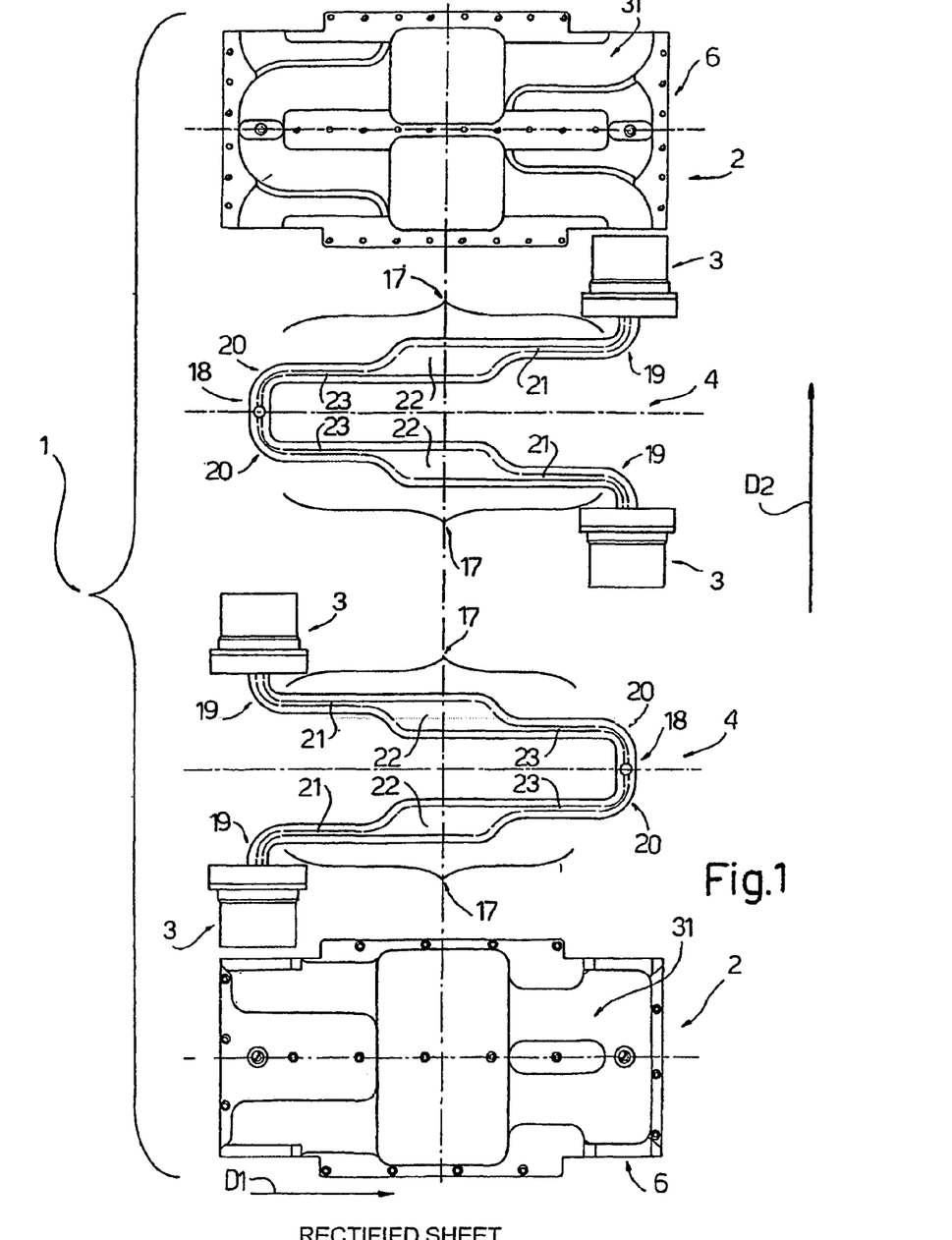
FIG. 1 shows a partly exploded view of a hybrid coupler in accordance with the present invention.

Number 1 in FIG. 1 indicates as a whole a hybrid coupler specially designed for UHF-band television transmission. Coupler 1 comprises a substantially rectangular box 2; four connectors 3; and two shaped lines 4, each connecting two connectors 3 and housed inside box 2. Box 2 is defined by two substantially identical aluminium half-shells 6 joined by means of screws.

Figure 2:
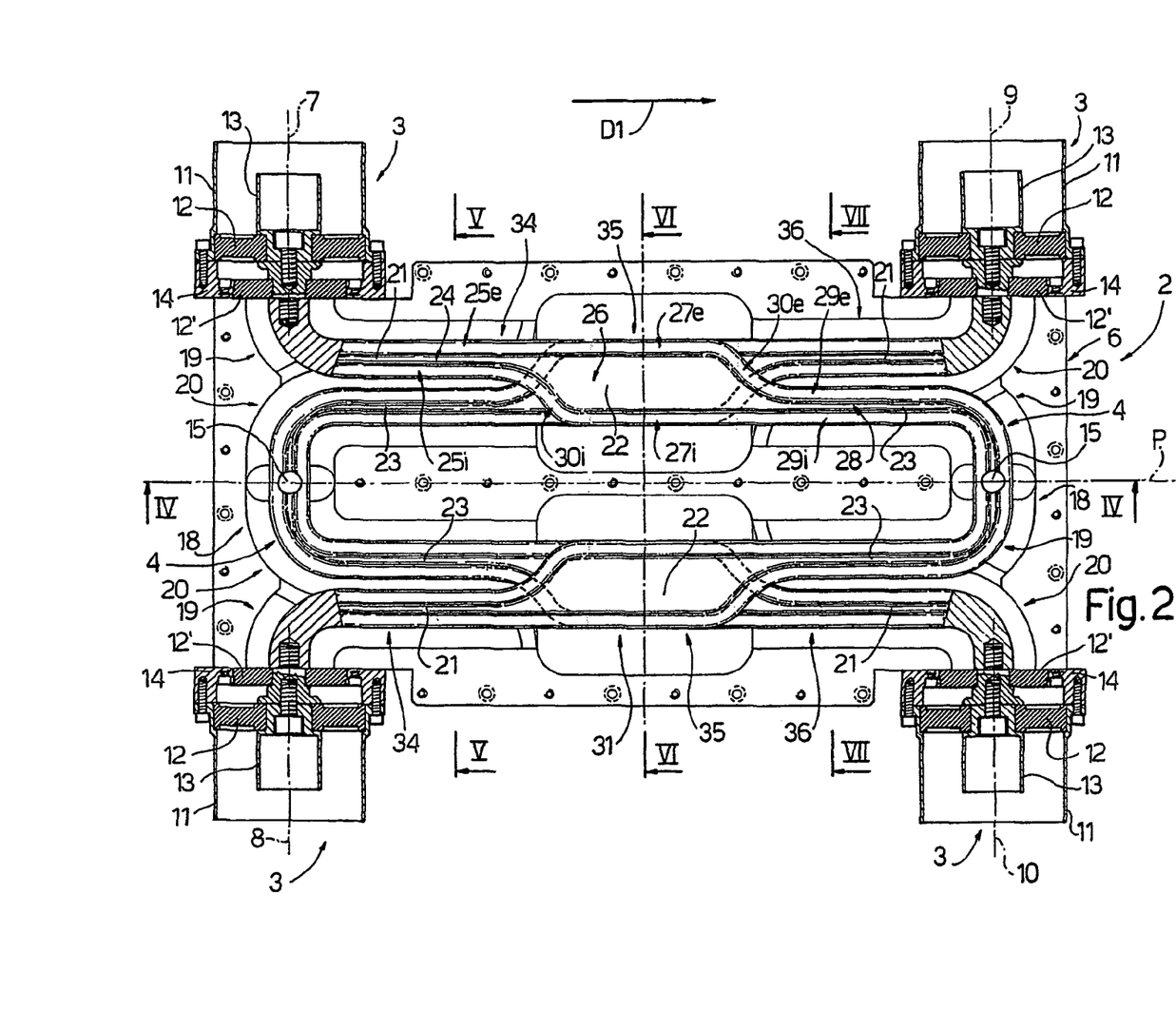
FIG. 2 shows a plan view, with parts in section and parts removed for clarity, of the FIG. 1 hybrid coupler.

With reference to FIG. 2, a half-shell 6 extends longitudinally in a direction D1, and is substantially symmetrical with respect to a plane of symmetry P parallel to direction D1 and perpendicular to the FIG. 2 plane. Connectors 3 are coaxial types and extend about respective axes 7, 8, 9 and 10, which are parallel to a direction D2 perpendicular to plane of symmetry P, and are aligned in pairs. Two connectors 3 connected to one of lines 4 have respective axes 7 and 8 aligned with each other, and the connectors 3 connected to the other line 4 have respective axes 9 and 10 aligned with each other. Each connector 3 is connected to box 2 and to one of lines 4. More specifically, a connector 3 has an outer bush 11 connected to box 2 and separated by a Teflon insulating ring 12; and an inner bush 13 screwed to one of lines 4. Inner bush 13 is connected to box 2 by a ring nut 14 insulated from line 4 by a Teflon insulating ring 12'. That is, ring nut 14 can support different types of connectors from those described above. Each line 4 is also supported by insulating spacers 15 made of Rexolite, projecting from half-shells 6, and fixed to the half-shells by means of threaded pins 16 (FIG. 3) enabling adjustment to the position of spacers 15.

Each connector 3 defines a port, in which outer bush 11 is connected electrically to box 2, and inner bush 13 to a line 4. That is, box 2 and lines 4 are made of highly conductive material, e.g. silver-plated aluminium, and are electrically insulated from one another.

With reference to FIG. 1, each line 4 defines a U-shaped path comprising two longitudinal arms 17 substantially parallel to direction D1; and a transverse arm 18 parallel to direction D2. Each arm 17 is connected to a respective connector 3 by a curved portion 19, and to an arm 18 by a further curved portion 20. Spacers 15 support each line 4 half-way between the two opposite ends, at arms 18.

Each arm 17 comprises, in succession between curved portions 19 and 20, three straight portions 21, 22, 23 which are parallel to plane of symmetry P, are substantially the same length as one another, and differ firstly as regards the distance from plane of symmetry P.

Figure 5:
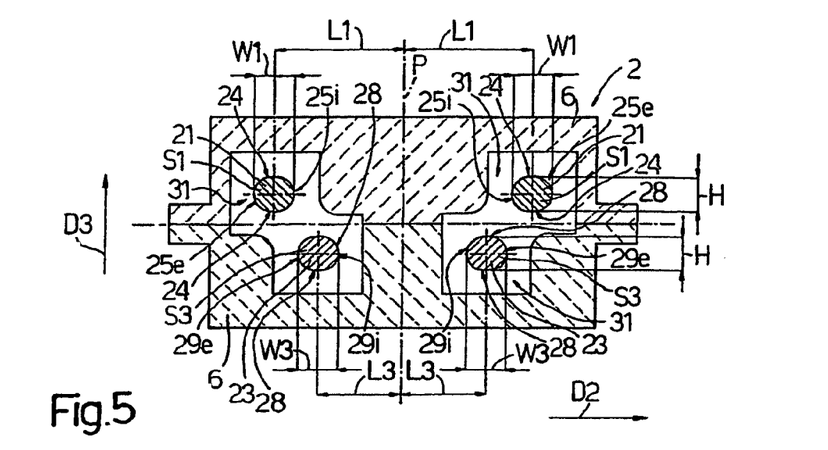
FIG. 5 shows a section along line V-V of the FIG. 2 hybrid coupler.
Figure 6:
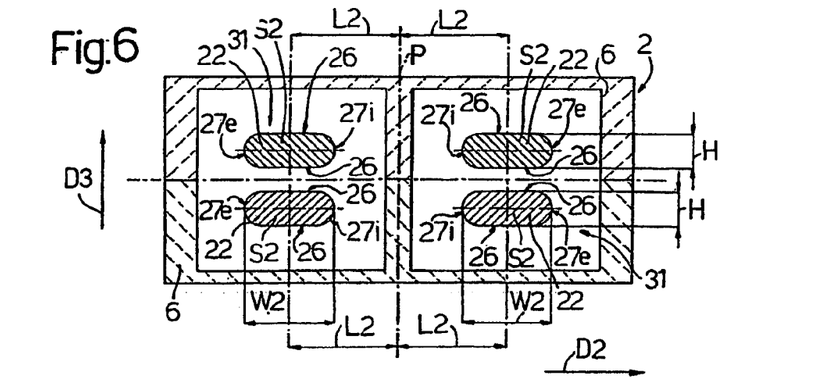
FIG. 6 shows a section along line VI-VI of the FIG. 2 hybrid coupler.
Figure 7:
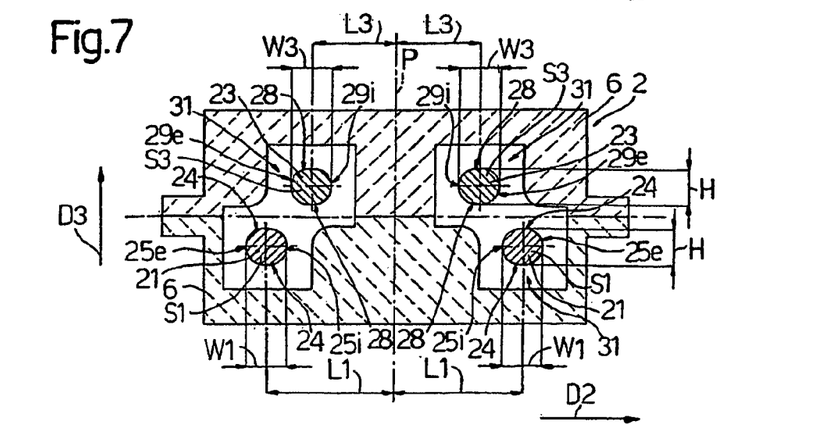
FIG. 7 shows a section along line VII-VII of the FIG. 2 hybrid coupler.

With reference to FIGS. 5 and 7, portion 21 has a cross section S1 whose barycentre is located a distance L1 from plane of symmetry P, and portion 23 has a cross section S3 whose barycentre is located a distance L3 from plane of symmetry P. With reference to FIG. 6, portion 22 has a cross section S2 whose barycentre is located a distance L2 from plane of symmetry P. Cross section S1 equals cross section S3, whereas cross section S2 is much larger than sections S1 and S3; and distances L1, L2, L3 decrease gradually, with L2 equal to the mean value of L1 and L3.

Cross section S1 has two parallel faces 24 facing each other and connected by two semicylindrical faces 25e and 25i; cross section S2 has two parallel faces 26 facing each other and connected by two semicylindrical faces 27e and 27i; and, similarly, cross section S3 has two parallel faces 28 facing each other and connected by two semicylindrical faces 29e and 29i. Faces 24, 26 and 28 extend perpendicularly to plane of symmetry P, and face 26 differs from faces 24 and 28 by being roughly five times as wide as faces 24 and 28.

Each cross section S1, S2, S3 is of constant height H (the distance between two opposite faces 24, 26, 28 respectively) in a direction D3 perpendicular to directions D1 and D2; faces 25i, 25e, 27i, 27e, 29i, 29e have the same radius of curvature, substantially equal to H/2, to avoid forming edges with flat faces 24, 26, 28; sections S1 and S3 are of respective constant widths W1 and W3; and cross section S2 is of a constant width W2 much greater than widths W1 and W3.

With reference to FIG. 2, each portion 21 is connected to a respective portion 22 so that semicylindrical faces 25e and 27e are aligned, whereas semicylindrical faces 25i and 27i are offset in direction D2 and connected by a semicylindrical face 30i which, in plan view, is curved to avoid angles and edges when passing from section S1 to section S2. Each portion 22 is connected to a respective portion 23 so that semicylindrical faces 27i and 29i are aligned, whereas semicylindrical faces 27e and 29e are offset in direction D2 and connected by a semicylindrical face 30e which, in plan view, is curved to avoid angles and edges when passing from section S1 to section S2. Semicylindrical faces 30i and 30e also have the same radius of curvature (substantially H/2) as semicylindrical faces 25i, 25e, 27i, 27e, 29i and 29e.

Figure 3:
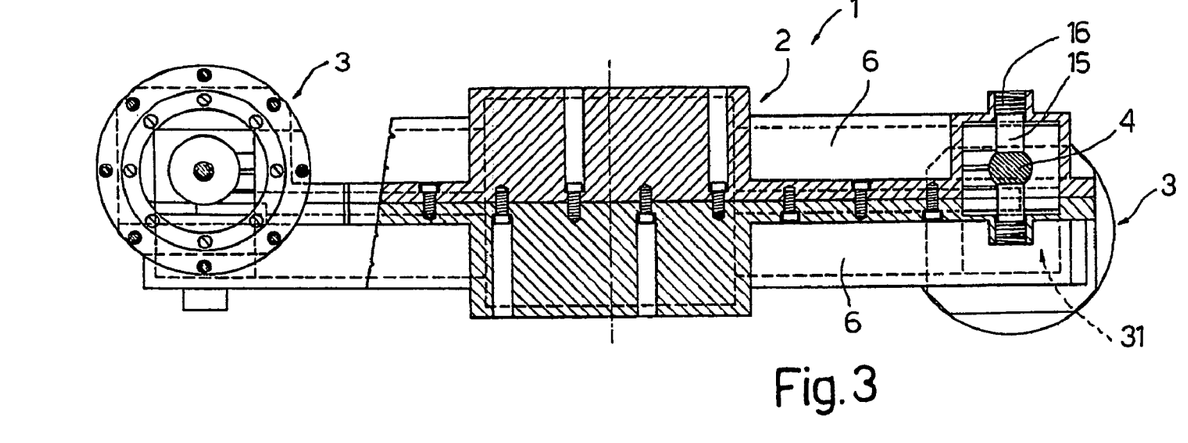
FIG. 3 shows a side view, with parts in section and parts removed for clarity, of the FIG. 1 hybrid coupler.
Figure 4:
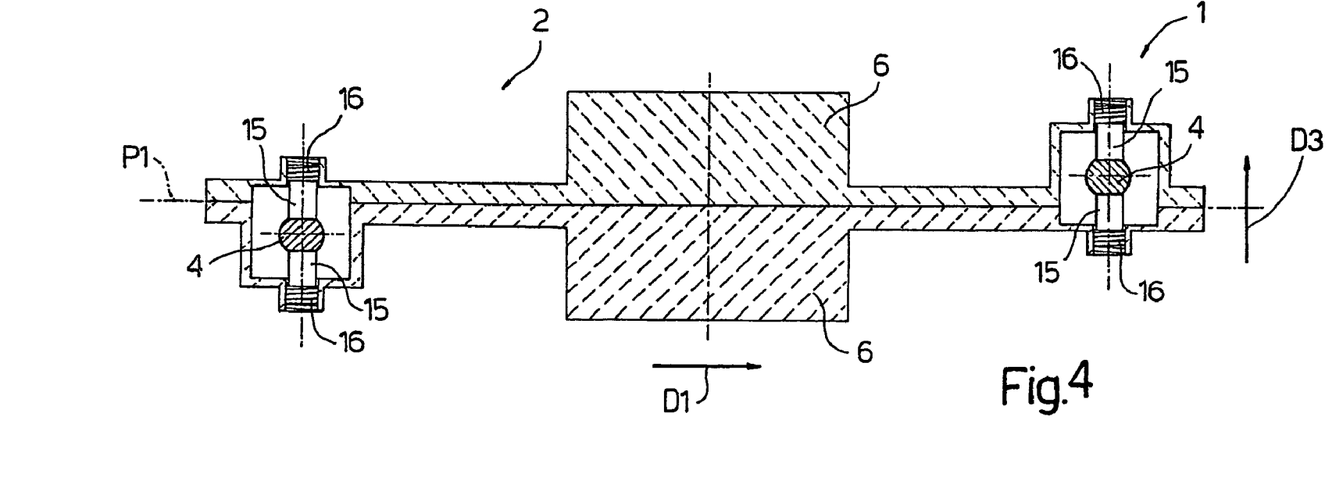
FIG. 4 shows a section along line IV-IV of the FIG. 2 hybrid coupler.

The two lines 4 are connected to each other, and are positioned facing and oriented in opposite directions. In other words, longitudinal arms 17 of lines 4 are arranged facing in pairs, while transverse arms 18 are located on opposite sides with respect to each other. Obviously, the two lines 4 lie in two separate planes, as shown more clearly in FIG. 4, in which the reference plane is a plane P1 containing the opposite faces of half-shells 6 joined to each other, and lines 4 lie in opposite sides of plane P1. With reference to FIG. 3, axes 7 and 8 of connectors 3 of one line 4 are located on the opposite side of plane P1 to axes 9 and 10 of the connectors of the other line 4.

With reference to FIG. 2, each half-shell 6 comprises a seat 31 for housing a respective line 4, and which, as shown in FIG. 1, is substantially the same shape as the line 4 it houses. To ensure correct operation of hybrid coupler 1, each line 4 is maintained in a given position by means of rings 12, 121, ring nut 14 (FIG. 2) and spacers 15 (FIG. 4), as shown in the FIGS. 4, 5, 6 and 7 sections.

The geometric characteristics of hybrid coupler 1, in particular the connection of lines 4, substantially define a "tandem" circuit, which term refers to the two halves of lines 4 (halves considered with respect to plane of symmetry P) joined together.

The three portions 21, 22, 23 of each arm 17 of one line 4 are connected respectively to the three portions 23, 22, 21 of the facing arm 17 of the other line 4. In other words, the two portions 21 and 23, the two portions 22, and the two portions 23 and 21 of the two facing arms 17 define coupling sections 34, 35 and 36 of the two lines 4. Lines 4 as a whole are connected along two sections 34, two sections 35, and two sections 36, so that connection is distributed along a relatively long, but at the same time compact, path, thus resulting in a compact coupler 1, and a connection which remains substantially constant over the whole UHF band (470-862 MHz).

Each coupling section 34 and 36 is designed for characteristic even mode and odd mode impedance values Ze=53.07 and Zo=47.11 ohms. Each coupling section 35 is designed for characteristic even mode and odd mode impedance values Ze=84.18 and Zo=29.70 ohms. The electric lengths of each portion 21, 22, 23 (each section 34, 35, 36) are equal to a quarter wave at the middle design frequency of 666 MHz, i.e. 112.5 mm. The profiles of connecting faces 30i and 30e are designed to eliminate reflection. Similarly, 90° curved portions 19 and 20 for interfacing arms 17 with connectors 3 and arms 18 are compensated to eliminate reflection by means of appropriate inner and outer radii, and are designed for a characteristic reference impedance of ZO=50 ohms. The radius of curvature of curved faces 25i, 25e, 27i, 27e, 29i, 29e, 30i, 30e reduces the electric fields and so increases the maximum power withstandable by hybrid coupler 1.

Each half of hybrid coupler 1 (half considered with respect to plane of symmetry P) produces a −8.343 dB connection of the connected portion of line 4. Tandem connection of the two −8.343 dB halves (with respect to plane of symmetry P) forms a quadrature hybrid coupler 1, i.e. the incoming signal from a connector 3 is divided equally at the output between two opposite connectors 3 (−3.01 dB) with a constant 90° phase shift between the two output connectors 3.

Figure 10:
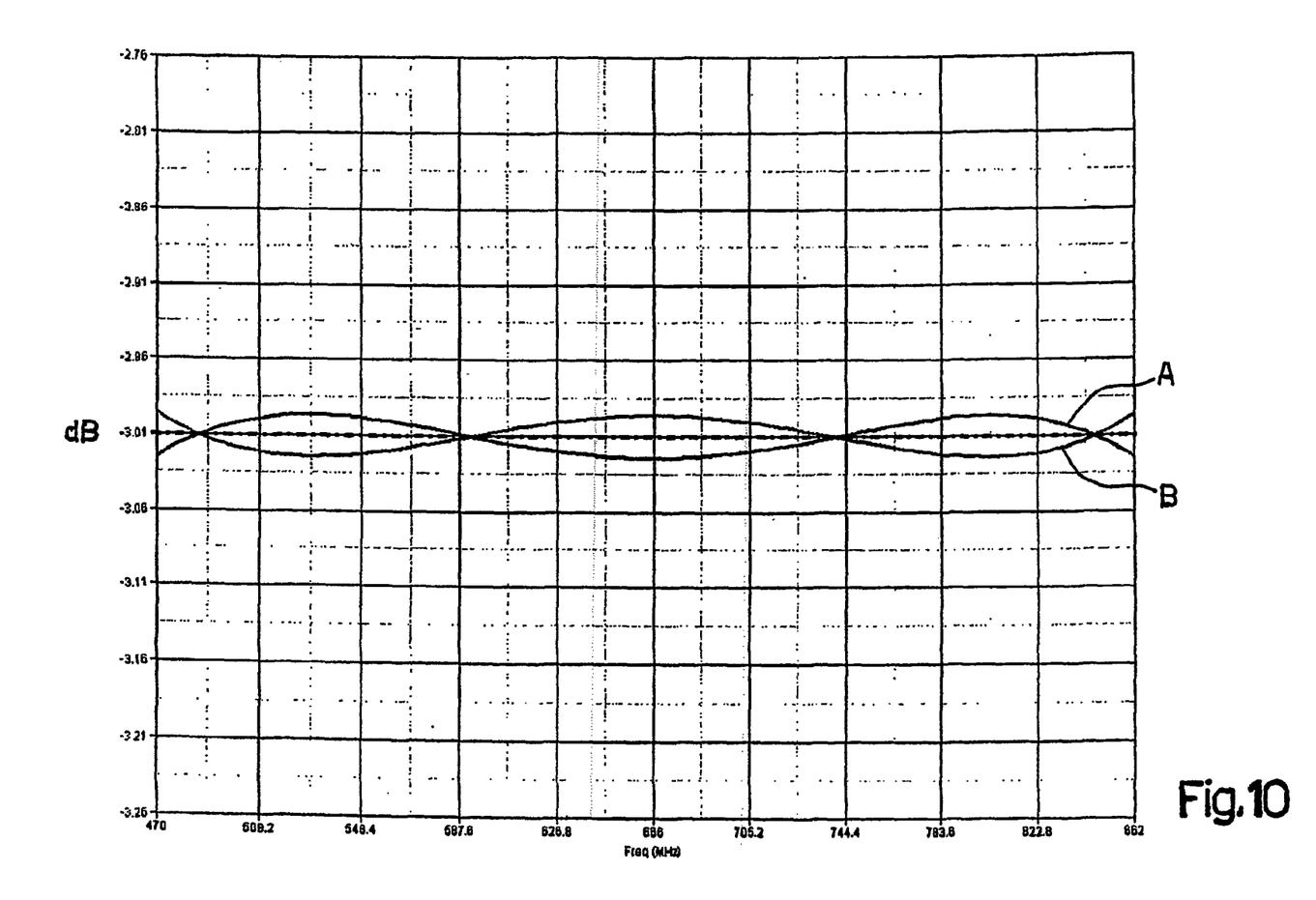
FIGS. 10, 11 and 12 show frequency response graphs of the FIG. 1 coupler.
Figure 11:
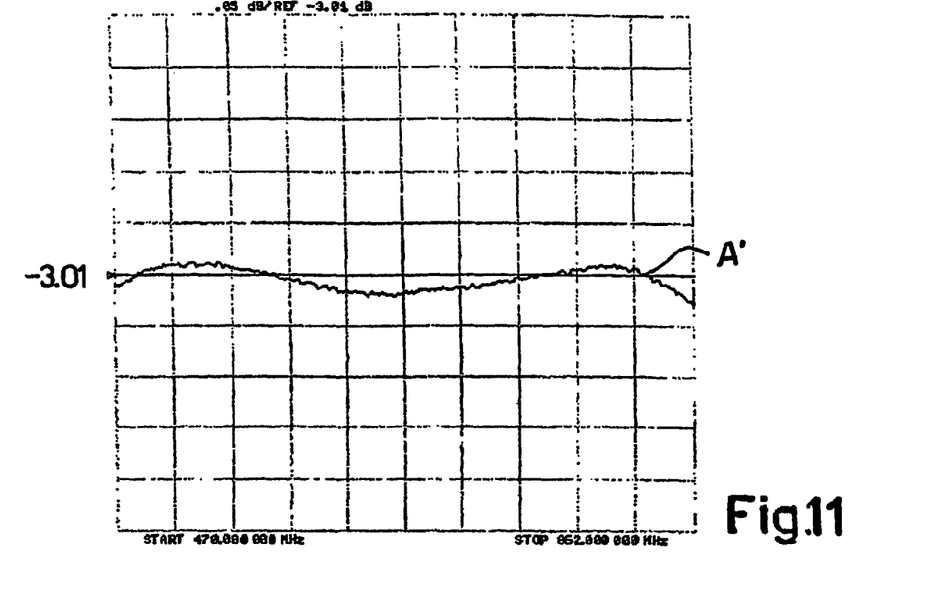
Figure 12:
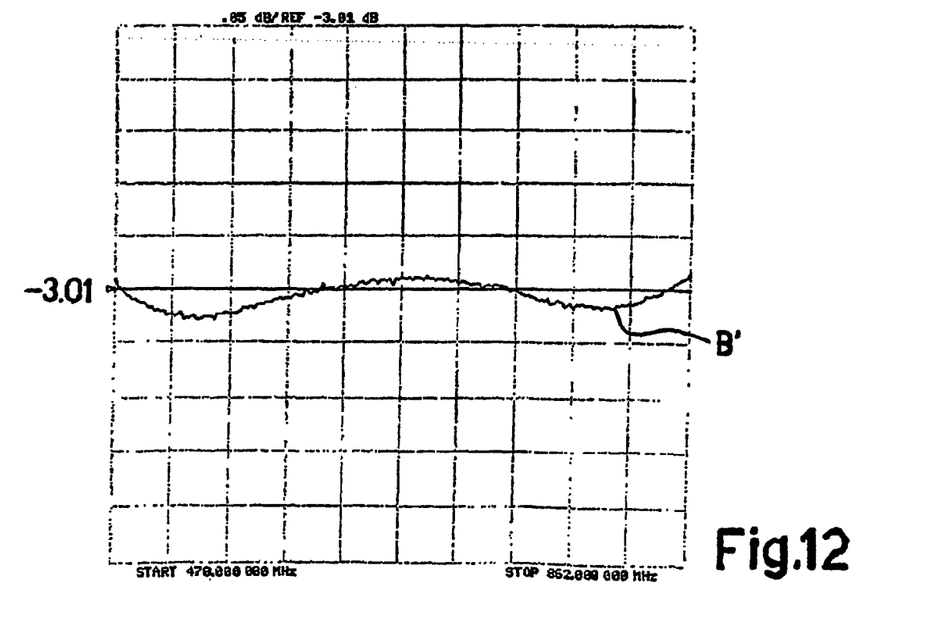

A and B in the FIG. 10 graph indicate the frequency response curves of the two output connectors 3 of coupler 1 in the UHF band, as obtained by simulation (computer software: CST Microwave Studio, CST GmbH). The FIGS. 11 and 12 frequency response graphs show, respectively, two curves A' and B' obtained experimentally for the two output connectors 3 of hybrid coupler 1, and which substantially coincide with simulated curves A and B (measuring equipment: Network Analyzer 8753ES, Agilent Technologies).

In other words, operation of hybrid coupler 1 as described above basically depends on the three-section, 34, 35, 36, arrangement and the "tandem" configuration.

Figure 8:
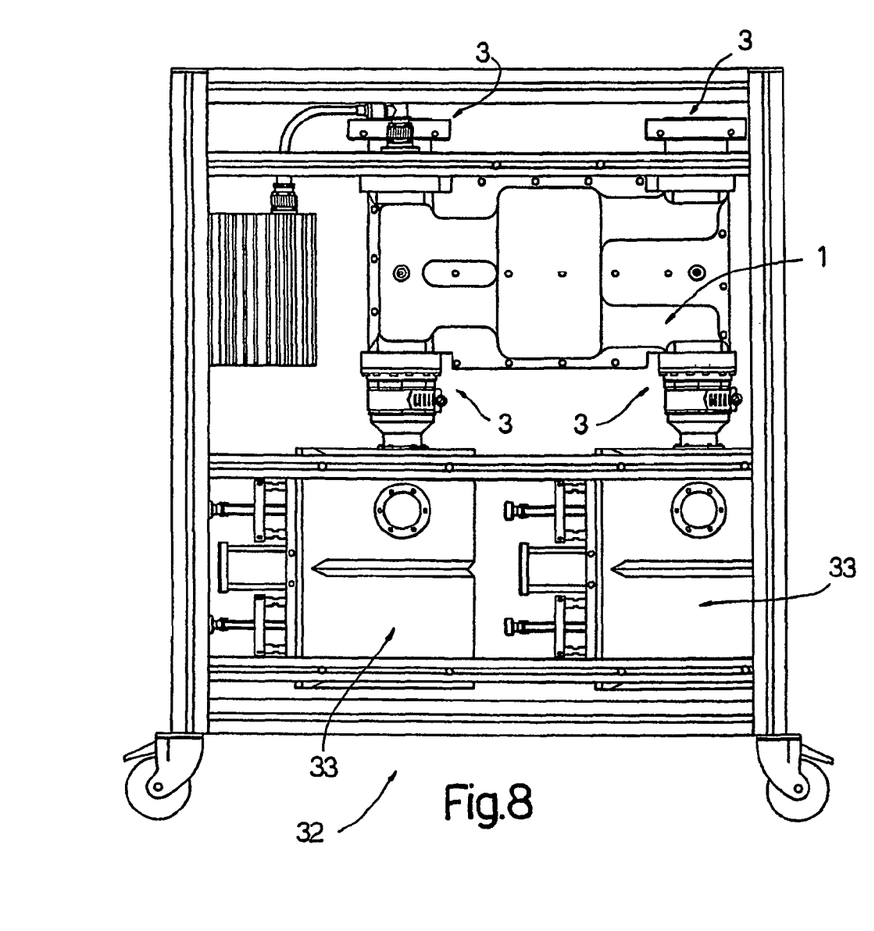
FIGS. 8 and 9 show a side view and front view respectively of a television channel mixer comprising two hybrid couplers as in FIG. 1.
Figure 9:
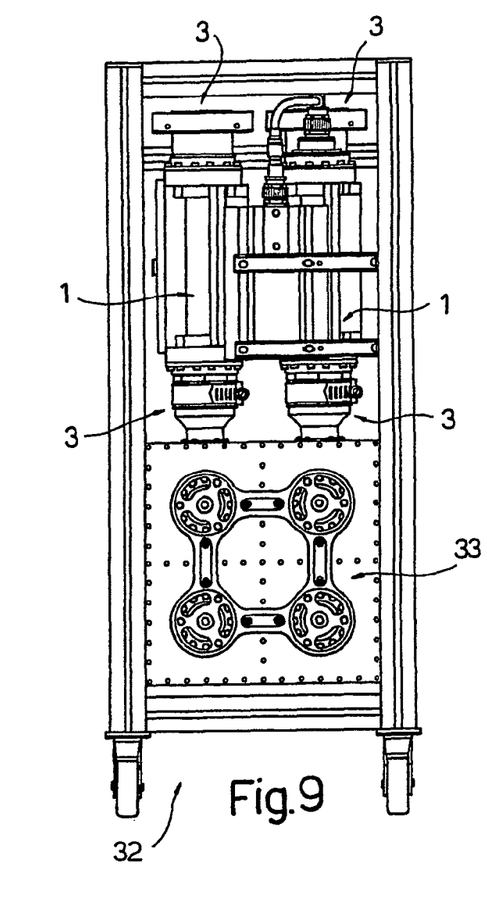

With reference to FIGS. 8 and 9, 32 indicates a double-bridge UHF television channel mixer comprising two hybrid couplers 1 connected to two UHF band-pass filters 33. One of connectors 3 is not connected, and is balanced conventionally with a 50 ohm resistive load, conveniently designed for much lower power than that of the incoming channels by virtue of the almost ideal properties of hybrid couplers 1.

Channel mixers as described herein may be cascade connected with no particular calibration required of the whole, by virtue of said system matching characteristics with a return loss value of over 35 dB at all times. Naturally, hybrid coupler 1 according to the invention may be sized differently from the one described, depending on the application power requirement; and double-bridge mixer 32 may obviously be equipped with filters of any kind to achieve the same characteristic advantages of the resulting device.

The invention claimed is:

1. A hybrid coupler for UHF-band television transmission, comprising a box (2) containing two lines (4), each of which is insulated from said box (2) and from the other line (4), and is connected to two respective connectors (3); wherein each line (4) is connected to the other line (4) in a tandem configuration, and comprises a first, a second, and a third portion (21, 22, 23) separate from one another and connected respectively to the third, second, and first portion (23, 22, 21) of the other line (4) to define a first, a second, and a third coupling section (34, 35, 36) to achieve a constant connection over the whole UHF band (470-862 MHz).

2. A coupler as claimed in claim 1, wherein each line (4) comprises two longitudinal arms (17), along each of which the first, second, and third portion (21, 22, 23) are located in succession; each longitudinal arm (17) of one line (4) being connected to one of the longitudinal arms (17) of the other line (4).

3. A coupler as claimed in claim 2, wherein each line (4) comprises a transverse arm (18) perpendicular to the longitudinal arms (17) so that the line (4) is substantially U-shaped; each transverse arm (18) of one line (4) being located on the opposite side with respect to the transverse arm (18) of the other line (4).

4. A coupler as claimed in claim 1, comprising a plane of symmetry (P); said first, said second, and said third portion (21, 22, 23) having, respectively, a first, a second, and a third cross section (S1, S2, S3) whose barycentres are located respectively at a first, a second, and a third distance (L1, L2, L3), in decreasing order, from said plane of symmetry (P).

5. A coupler as claimed in claim 4, that wherein the first and third cross section (S1, S3) are equal.

6. A coupler as claimed in claim 4, wherein said second cross section (S2) is larger than the first and third cross section (S1, S3).

7. A coupler as claimed in claim 1, wherein the first portion (21) comprises two parallel first flat faces (24) connected by two first semicylindrical faces (25i, 25e).

8. A coupler as claimed in claim 1, wherein the second portion (22) comprises two parallel second flat faces (26) connected by two second semicylindrical faces (27i, 27e).

9. A coupler as claimed in claim 1, wherein the third portion (23) comprises two parallel third flat faces (28) connected by two third semicylindrical faces (29i, 29e).

10. A coupler as claimed in claim 7, wherein the second flat faces (26) are much wider than the first and second flat faces (24, 28).

11. A coupler as claimed in claim 8, wherein a second flat face (26) of each second portion (22) of one line (4) faces and is parallel to a second flat face (26) of a second portion (22) of the other line (4).

12. A coupler as claimed in claim 1, wherein said second coupling section (35) has an even mode impedance of Ze=84.18 ohms, and an odd mode impedance of Ze=29.70 ohms.

13. A coupler as claimed in claim 1, wherein the first and third coupling section (34, 36) each have an even mode impedance of Ze=53.07 ohms, and an odd mode impedance of Zo=47.11 ohms.

14. A coupler as claimed in claim 1, wherein each first, second, and third portion (21, 22, 23) is of a length (L) equal to a quarter wave at the middle design frequency of 666 MHz substantially equal to 112.5 mM.

15. A coupler as claimed in claim 3, wherein each longitudinal arm (17) is connected to a respective connector (3) by a first curved portion (19) of line (4) to form a 90° angle, and is connected to the transverse arm (18) by a second curved portion (20) of line to form a 90° angle.

16. A coupler as claimed in claim 14, wherein the characteristic impedance of the first and second curved portion (19, 20) is ZO=50 ohms.

17. A coupler as claimed in claim 5, the second cross section (S2) is connected to the first and third cross section (S1, S2) by two respective further semicylindrical faces (30i, 30e) which, in plan view, are curved.

18. A coupler as claimed in claim 1, wherein said box (2) comprises two identical half-shells (6) joined to each other; each half-shell (6) having a seat (31) for housing a respective line (4).

19. A coupler as claimed in claim 18, wherein each line (4) is insulated from said half-shells (6) by rings (12, 12') located at said connectors (3), and by spacers (15).

20. A coupler as claimed in claim 19, wherein said spacers (15) are adjustable by means of threaded pins (16) screwed to said half-shells (6).

21. A UHF television channel mixer comprising two band-pass filters (33); the mixer (32) comprising two hybrid couplers (1) as claimed in claim 1 and connected to said band-pass filters (33) in a double-bridge structure.

22. A mixer as claimed in claim 21, wherein one of the connectors (3) is unused, and is balanced by a 50 ohm resistive load.

* * * * *